United States Patent
Hitaka

(10) Patent No.: US 10,063,734 B2
(45) Date of Patent: Aug. 28, 2018

(54) INFORMATION PROCESSING APPARATUS THAT RECEIVES DATA FROM EXTERNAL APPARATUS VIA NETWORK, METHOD OF CONTROLLING THE SAME, AND STORAGE MEDIUM

(71) Applicant: CANON KABUSHIKI KAISHA, Tokyo (JP)

(72) Inventor: Yosato Hitaka, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 262 days.

(21) Appl. No.: 14/826,636

(22) Filed: Aug. 14, 2015

(65) Prior Publication Data

US 2016/0057310 A1    Feb. 25, 2016

(30) Foreign Application Priority Data

Aug. 25, 2014 (JP) .................................. 2014-170565
Jul. 29, 2015 (JP) .................................. 2015-149583

(51) Int. Cl.
*H04N 1/21* (2006.01)
*H04N 1/00* (2006.01)

(52) U.S. Cl.
CPC ....... *H04N 1/2166* (2013.01); *H04N 1/00244* (2013.01)

(58) Field of Classification Search
CPC ............. H04N 1/2166; H04N 1/00244; H04N 1/00257; H04N 1/00251; H04N 2101/00; H04N 1/00204; H04N 1/32561; H04N 5/232; H04N 5/772

See application file for complete search history.

(56) References Cited

U.S. PATENT DOCUMENTS

| | | | |
|---|---|---|---|
| 8,238,689 B2 | 8/2012 | Inoue | |
| 2007/0180025 A1* | 8/2007 | Kobayakawa | G06Q 90/00 709/204 |
| 2007/0195350 A1* | 8/2007 | Hattori | H04N 1/00204 358/1.13 |
| 2013/0100265 A1* | 4/2013 | Suzuki | A61B 1/00045 348/74 |
| 2014/0063545 A1* | 3/2014 | Takahashi | G06F 3/1293 358/1.15 |

FOREIGN PATENT DOCUMENTS

WO    2008075745 A1    6/2008

* cited by examiner

*Primary Examiner* — Luong T Nguyen
(74) *Attorney, Agent, or Firm* — Rossi, Kimms & McDowell LLP

(57) ABSTRACT

An information processing apparatus that is capable of efficiently acquiring a developed image obtained by developing a RAW file. A plurality of JPEG files are stored in a information processing apparatus. The information processing apparatus inquires of an information management apparatus about apparatus information concerning a external apparatus holding a RAW file corresponding to a JPEG file selected on the information processing apparatus. Then, the information processing apparatus connects to the external apparatus according to the apparatus information received from the information management apparatus, and requests the external apparatus to perform processing for developing the RAW file corresponding to the selected JPEG file.

9 Claims, 14 Drawing Sheets

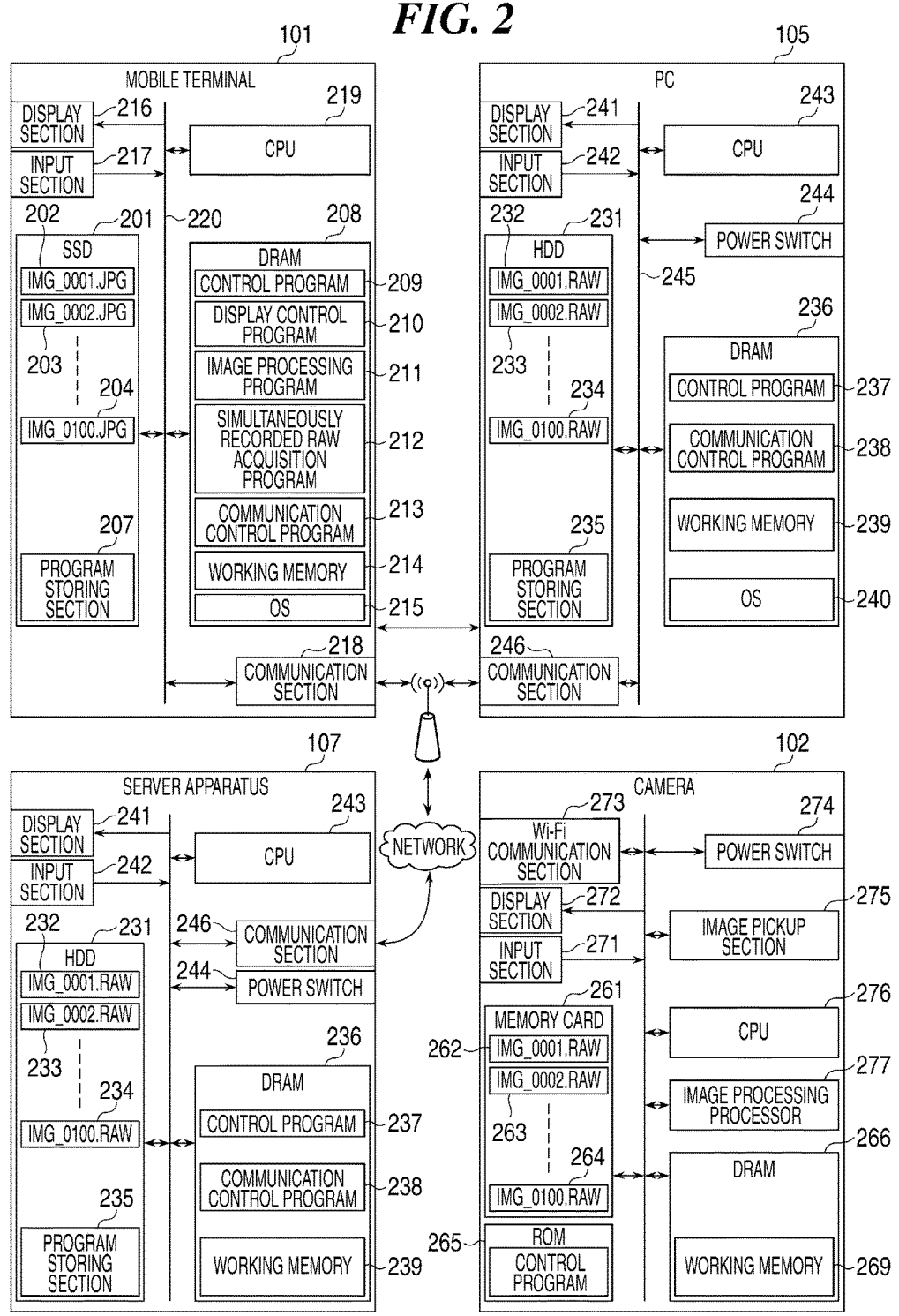

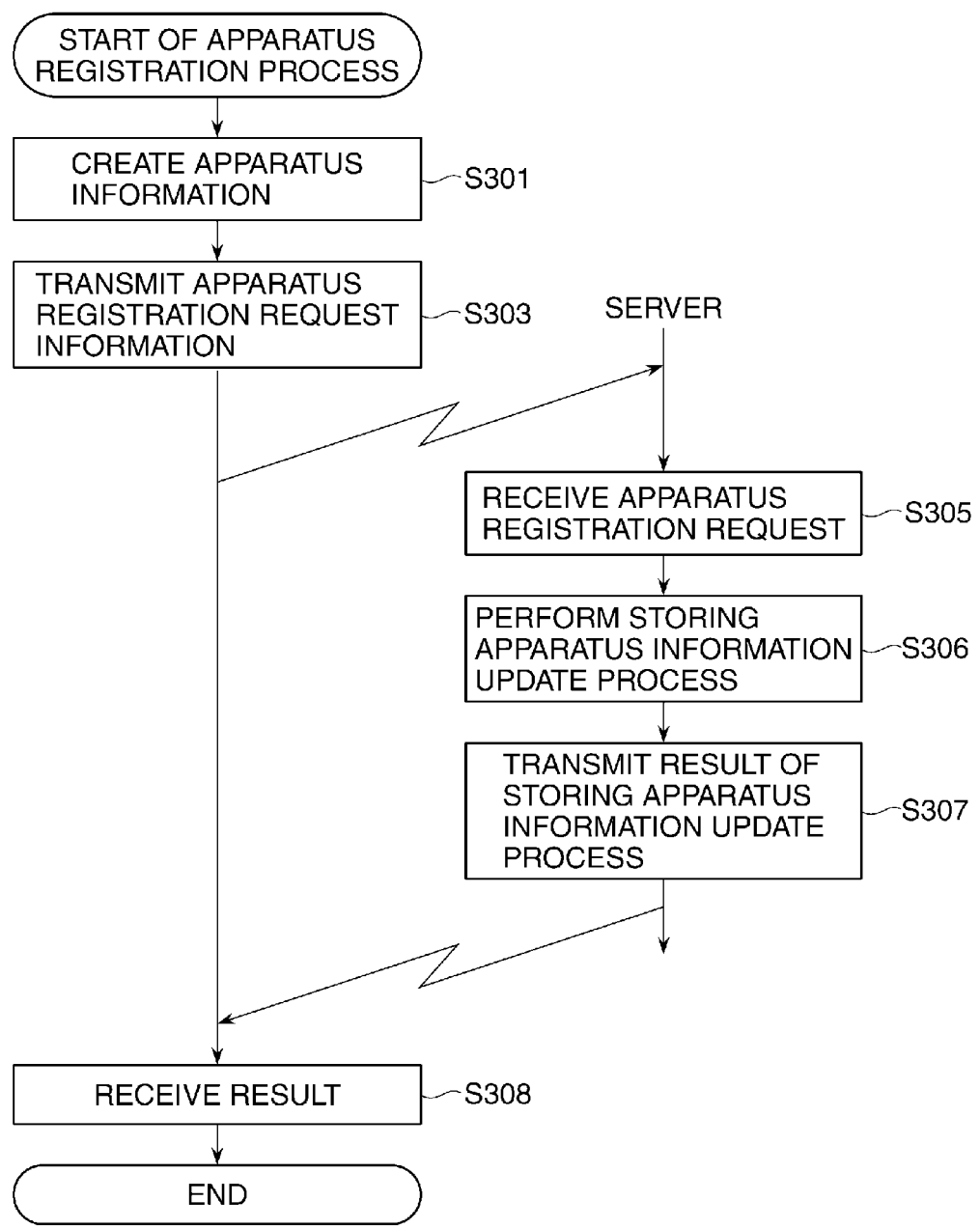

| STORING APPARATUS INFORMATION | |
|---|---|
| GROUP ID | AAA |
| APPARATUS TYPE | APPARATUS ID, APPARATUS ADDRESS |
| CAMERA | 041-xxxxxxx |
| CAMERA | 053-xxxxxxx |
| PC | 0123-4567-89-AB |
| PC | 6874-2109-54-CD |
| TABLET | 0123-489 |
| SMARTPHONE | 6874-1054 |
| SERVER | AAMQ-AAAxxxxx |

FIG. 7A

| 502 REGISTRATION REQUEST CODE | | |
|---|---|---|
| 503 APPARATUS INFORMATION | APPARATUS TYPE (722) | APPARATUS ID, APPARATUS ADDRESS (723) |
| | PC | 0123-4567-89-AB |
| 504 FILE INFORMATION | IMAGE ID OF SIMULTANEOUSLY RECORDED JPEG & SIMULTANEOUSLY RECORDED RAW (726) | |
| | 2852C002-D160-4bc4-BF57-8556DCCAD835 | |

FIG. 7B

FILE MANAGEMENT INFORMATION

| APPARATUS INFORMATION (503) | | FILE INFORMATION (504) |
|---|---|---|
| APPARATUS TYPE (505 / 722) | APPARATUS ID, APPARATUS ADDRESS (723) | IMAGE ID OF SIMULTANEOUSLY RECORDED JPEG & SIMULTANEOUSLY RECORDED RAW (726) |
| CAMERA | 041-xxxxxxxx | 2852C002-D160-4bc4-BF57-8556DCCAD835 |
| | | 90EBBD3F-7350-4385-8F84-C7D431A95E3D |
| | | 128C24DE-521F-46fa-AD7A-5074D450380C |
| | | ⋮ |
| APPARATUS TYPE | APPARATUS ID, APPARATUS ADDRESS | IMAGE ID OF SIMULTANEOUSLY RECORDED JPEG & SIMULTANEOUSLY RECORDED RAW |
| PC | 0123-4567-89-AB | 09C100D7-32DF-45b9-826F-C5462C11694D |
| | | B70BAEEE-8B0D-4152-9532-449EC4312465 |
| | | ⋮ |
| APPARATUS TYPE | APPARATUS ID, APPARATUS ADDRESS | IMAGE ID OF SIMULTANEOUSLY RECORDED JPEG & SIMULTANEOUSLY RECORDED RAW |
| SERVER | AAMQ-AAAxxxxx | F332AC2C-1563-4e24-A721-5229E0888109 |
| | | 4A44BCE9-44B9-48fc-BD06-F6F16F61FEC0 |

INFORMATION PROCESSING APPARATUS THAT RECEIVES DATA FROM EXTERNAL APPARATUS VIA NETWORK, METHOD OF CONTROLLING THE SAME, AND STORAGE MEDIUM

BACKGROUND OF THE INVENTION

Field of the Invention

The present invention relates to an information processing apparatus, a method of controlling the same, and a storage medium, and more particularly to an information processing apparatus that receives data from an external apparatus via a network.

Description of the Related Art

In general, in an image pickup apparatus, such as a digital camera, an image signal (RAW data) is obtained by converting the output from an image pickup device, such as a CCD or CMOS sensor, from analog to digital by an A/D converter. Further, when a so-called RAW photographing mode is set, the RAW data is recorded in a memory, such as an SD card, as a RAW file without being subjected to image processing, such as development processing, by an image processor disposed at a location downstream of the A/D converter.

When performing image processing on this RAW file, the SD card is inserted in an image processing apparatus (e.g. a personal computer) which is one of information processing apparatuses. Then, image processing (e.g. development processing) is performed by the information processing apparatus, and an image corresponding to the RAW file is displayed on a display section.

Incidentally, the RAW file has the following features: Although an image which is higher in image quality than a JPEG image can be obtained by development processing, it takes time to develop the RAW file. The RAW file is larger in file size than the JPEG file. On the other hand, there is an image quality adjustment function which can be performed only on a RAW file which has not been subjected to development processing (hereinafter referred to as the RAW function).

Therefore, it is desirable to use a JPEG file when simply displaying an image, and use a RAW file only when using the RAW function.

For this reason, recently, there has been proposed an image pickup apparatuses equipped with a "RAW+JPEG photographing mode" which is a mode for recording a RAW file in a memory, and simultaneously recording a JPEG file in the memory.

When performing photographing using the "RAW+JPEG photographing mode", a RAW file and a JPEG file are transferred from the image pickup apparatus to the information processing apparatus. Then, the information processing apparatus usually displays an image using the JPEG file, and uses the RAW file when using the RAW function, such as color adjustment.

Hereinafter, a RAW file forming a pair with a JPEG file is referred to as the simultaneously recorded RAW file. Further, the JPEG file forming the pair with the RAW file is referred to as the simultaneously recorded JPEG file.

As described above, when the simultaneously recorded JPEG file and the simultaneously recorded RAW file, which have been obtained through photographing, are used in the information processing apparatus, it is necessary to manage these files as a pair.

Incidentally, conventionally, there has been proposed an image processing system in which a client transmits a RAW file to a server via a network, and the RAW data is developed in the server (see WO08/075745).

According to this conventional technique, the client is required to hold the RAW file of a large size, which causes a problem that the client is limited to an apparatus having a large storage capacity. Further, when a RAW file is transmitted from the client to the server, a significant communication load is applied to the client since the RAW file is large in file size.

SUMMARY OF THE INVENTION

The present invention provides an information processing apparatus that is capable of efficiently acquiring a developed image obtained by developing a RAW file, a method of controlling the same, and a storage medium.

In a first aspect of the present invention, there is provided an information processing apparatus comprising a storage unit configured to store a plurality of processed data items, an acquisition unit configured to acquire apparatus information concerning an external apparatus holding unprocessed data corresponding to the processed data, and a requesting unit configured to communicate with the external apparatus using the apparatus information, and request the unprocessed data.

In a second aspect of the present invention, there is provided an information processing apparatus comprising a first acquisition unit configured to acquire, out of unprocessed data, which is data obtained by an image pickup device and on which predetermined processing has not been performed, and processed data, which is data obtained by the image pickup device and on which the predetermined processing has been performed, the processed data, a storage unit configured to store the processed data in a manner associated with an identifier for uniquely identifying the unprocessed data and the processed data, a second acquisition unit configured to acquire apparatus information concerning a storing apparatus holding unprocessed data associated with the identifier, a requesting unit configured to request the storing apparatus to perform processing for developing the unprocessed data, according to the apparatus information, and a reception unit configured to receive a result of the processing for developing the unprocessed data.

In a third aspect of the present invention, there is provided a method of controlling an information processing apparatus, comprising storing a plurality of processed data items, acquiring apparatus information concerning an external apparatus holding unprocessed data corresponding to the processed data, and communicating with the external apparatus using the apparatus information, and requesting the unprocessed data.

In a fourth aspect of the present invention, there is provided a method of controlling an information processing apparatus, comprising acquiring, out of unprocessed data, which is data obtained by an image pickup device and on which predetermined processing has not been performed, and processed data, which is data obtained by the image pickup device and on which the predetermined processing has been performed, the processed data, storing the processed data in a manner associated with an identifier for uniquely identifying the unprocessed data and the processed data, acquiring apparatus information concerning a storing apparatus holding unprocessed data associated with the identifier, requesting the storing apparatus to perform processing for developing the unprocessed data, according to the apparatus information, and receiving a result of the processing for developing the unprocessed data.

In a fifth aspect of the present invention, there is provided a non-transitory computer-readable storage medium storing a computer-executable program for executing a method of controlling an information processing apparatus, wherein the method comprises storing a plurality of processed data items, acquiring apparatus information concerning an external apparatus holding unprocessed data corresponding to the processed data, and communicating with the external apparatus using the apparatus information, and requesting the unprocessed data.

In a sixth aspect of the present invention, there is provided a non-transitory computer-readable storage medium storing a computer-executable program for executing a method of controlling an information processing apparatus, wherein the method comprises acquiring, out of unprocessed data, which is data obtained by an image pickup device and on which predetermined processing has not been performed, and processed data, which is data obtained by the image pickup device and on which the predetermined processing has been performed, the processed data, storing the processed data in a manner associated with an identifier for uniquely identifying the unprocessed data and the processed data, acquiring apparatus information concerning a storing apparatus holding unprocessed data associated with the identifier, requesting the storing apparatus to perform processing for developing the unprocessed data, according to the apparatus information, and receiving a result of the processing for developing the unprocessed data.

According to the present invention, the information processing apparatus requests an apparatus (other apparatus) holding unprocessed data (e.g. a RAW file) corresponding to processed data (e.g. a JPEG file) to perform processing for developing the undeveloped data. Therefore, even if the information processing apparatus has a small storage capacity and a low communication capability, it is possible to efficiently acquire the processing result.

Further features of the present invention will become apparent from the following description of exemplary embodiments (with reference to the attached drawings).

BRIEF DESCRIPTION OF THE DRAWINGS

FIG. 2 is a block diagram of a mobile terminal, a camera, a PC, and a server apparatus of the image processing system shown in FIG. 1.

FIG. 3 is a flowchart of an apparatus registration process performed by the mobile terminal, the PC, or the camera, and the server apparatus.

FIG. 7A is a diagram showing the file registration request information.

FIG. 7B is a diagram showing the file management information.

DESCRIPTION OF THE EMBODIMENTS

The present invention will now be described in detail below with reference to the accompanying drawings showing embodiments thereof.

Figure 1:
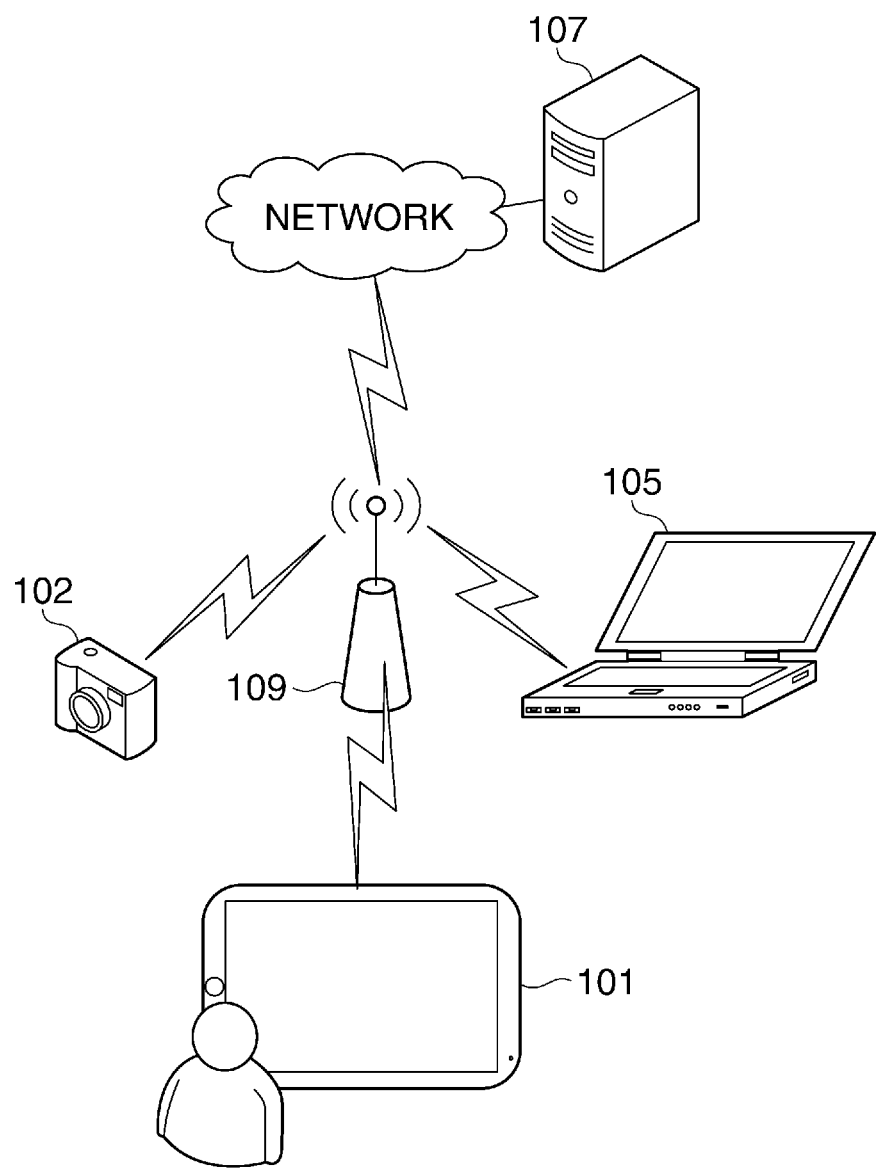
FIG. 1 is a diagram showing an example of an image processing system including an information processing apparatus according to a first embodiment of the present invention.

FIG. 1 is a diagram showing an example of an image processing system including an information processing apparatus according to a first embodiment of the present invention.

Referring to FIG. 1, reference numeral 101 denotes a portable mobile terminal equipped with a communication function, such as a tablet computer or a smartphone, as the information processing apparatus according to the first embodiment. The mobile terminal 101 stores an image file (e.g. a JPEG file) which is generated by performing development processing on RAW data obtained through photographing processing in a digital camera (hereinafter simply referred to as the camera).

The mobile terminal 101 is capable of displaying a plurality of JPEG files as thumbnail images according to a user's operation. Further, the mobile terminal 101 is capable of enlarging and displaying a selected one of the plurality of JPEG files.

A personal computer (PC) 105 is an information processing apparatus equipped with a hard disk drive (HDD) having a larger capacity than the mobile terminal 101, and the HDD stores a RAW file including RAW data corresponding to the JPEG file.

A server computer apparatus (hereinafter referred to as the server apparatus) 107 is an information management apparatus, and is connected to the mobile terminal 101, the camera, denoted by reference numeral 102, and the PC 105, via a network, such as the Internet.

The server apparatus 107, the mobile terminal 101, the camera 102, and the PC 105, mentioned above, are connected by a router 109 that provides a routing function. Although it is assumed here that the router 109 uses Wi-Fi, which is one of wireless LAN standards, for communication, any other communication method may be used.

The server apparatus 107, the mobile terminal 101, the camera 102, and the PC 105 include a WOL (Wake-on-LAN)-compatible apparatus. An apparatus other than the WOL-compatible apparatus can remotely start and terminate the WOL-compatible apparatus by transmitting a magic packet to the WOL-compatible apparatus.

The camera 102 is capable of selecting any of the apparatuses other than itself, and automatically or manually transmitting an image file (a JPEG file or a RAW file) obtained by image pickup to the selected other apparatus.

Although in the illustrated example, the server apparatus 107, the mobile terminal 101, the camera 102, and the PC 105 each are provided in a singular number in order to simplify the description, the server apparatus 107, the mobile terminal 101, the camera 102, and the PC 105 may be each provided in a plural number.

The camera 102 can be set to perform image pickup processing, and generate and record a file including image data of one of a plurality of data formats, in response to one image pickup instruction. Further, the camera 102 can be set to perform image pickup processing, generate image files including image data of a plurality of data formats, and record a set of the generated image files, in response to one image pickup instruction. In the present embodiment, the setting for recording a set of image data items of the plurality of formats in response to one image pickup instruction is referred to as the simultaneous recording mode. For example, image data of one of the plurality of formats is a RAW file, which is an image file including RAW data obtained by encoding data output from an image pickup device with high efficiency using a technique, such as wavelet transform or difference encoding, to thereby convert the data to a compressed state. That is, the RAW file is a data file in which data output from the image pickup device of the camera 102 is recorded nearly as it is. Note that the RAW data may be reversibly compressed. Then, the RAW data of the RAW file is subjected to development processing and compression processing by JPEG, whereby the camera 102 acquires a JPEG file. Note that development processing is performed using a predetermined adjustment value. From the above, the RAW file can also be referred to as the unprocessed data because it has not been subjected to predetermined processing yet, and on the other hand, the JPEG file can be referred to as the processed data.

Note that the present invention can be similarly realized for an image file obtained by converting data to another file format, such as a TIFF format, instead of the JPEG format. Further, the JPEG file is not limited to one generated from a RAW file. For example, the JPEG file may be generated by generating RAW data through encoding of data in a state just output from the image pickup device of the camera 102 with high efficiency using a technique, such as wavelet transform or difference encoding, to thereby convert the data to a compressed state, then subjecting the RAW data to development processing, and thereafter converting the developed data to the JPEG format. Note that development processing for generating a JPEG file includes processing for adjusting parameters of contrast, white balance, color balance, brightness, saturation, and so forth. Thus, the JPEG file has the data subjected to compression processing, and hence the JPEG file is smaller in data amount than the RAW file. However, the JPEG file is larger in degree of degradation from the data obtained from the image pickup device.

FIG. 2 is a block diagram of the mobile terminal 101, the camera 102, the PC 105, and the server apparatus 107 of the image processing system shown in FIG. 1.

The mobile terminal 101 is provided with a nonvolatile memory, and for example, an SSD (Solid State Drive) 201 is used as the nonvolatile memory. For an apparatus often used in a carried state, such as a mobile terminal, not an HDD (Hard Disk Drive) generally provided in a PC or the like, but the SSD, which is low in power consumption and strong against impact, is used.

However, the SSD is higher in price per bit than the HDD, and hence the SSD 201 provided in the mobile terminal 101 has a capacity of 16 GB or so, and is not suitable for storing a lot of RAW files (undeveloped image files).

In the illustrated example, the SSD 201 records JPEG files 202, 203, . . . , and 204, for example, which have been photographed by the camera 102 in the "RAW+JPEG photographing mode". The simultaneously recorded RAW files corresponding to the JPEG files 202, 203, . . . , and 204 are in a state not yet transferred from the camera 102, by taking into account the capacity of the SSD 201. These simultaneously recorded RAW files have been transferred only to the PC 105.

A program storing section 207 is defined in the SSD 201, and stores programs executed by the mobile terminal 101 and an operating system (OS). The programs are loaded from the program storing section 207 into a DRAM (Dynamic Random Access Memory) 208, which is a primary memory, and are executed by a CPU (Central Processing Unit) 219.

In the illustrated example, the OS, denoted by reference numeral 215, a control program 209, a display control program 210, an image processing program 211, a simultaneously recorded RAW acquisition program 212, and a communication control program 213 have been loaded into the DRAM 208 as the programs. Further, a working memory 214, which is a work area for the CPU 219, is defined in the DRAM 208.

The control program 209 is a program for controlling various operations, such as operations for control of the execution sequence of various programs. The display control program 210 is a program for controlling the display of a display section 216. The image processing program 211 is a program for performing various image processing (e.g. brightness adjustment, contrast adjustment, sharpness adjustment, color density adjustment, noise reduction, and white balance adjustment) on image data (image file).

The simultaneously recorded RAW acquisition program 212 is a program for retrieving a simultaneously recorded RAW file from the other apparatus when a user has selected one JPEG file from the JPEG files 202 to 204 as a selected image file.

The communication control program 213 is a program for controlling a communication section 218. The working memory 214 is a memory area used as a working memory when executing the programs in the DRAM 208.

The display section 216 displays an image and the like, and is e.g. a liquid crystal display. An input section 217 is used when a user inputs various instructions, and includes e.g. a touch panel. Further, the mobile terminal 101 performs communication with other apparatuses using the communication section 218.

The display section 216, the input section 217, the SSD 201, the CPU 219, the DRAM 208, and the communication section 218, mentioned above, are interconnected via an internal bus 220. Further, in the case of the illustrated example in FIG. 2, although other components are omitted, the mobile terminal 101 has the components similar to those of a general mobile terminal.

The PC 105 includes an HDD 231 as a nonvolatile memory. The HDD 231 has a capacity of e.g. 500 GB or so.

In the illustrated example, the HDD 231 has recorded RAW files 232, 233, . . . , and 234, which have been photographed by the camera 102 in the "RAW+JPEG photographing mode". These RAW files 232, 233, . . . , and 234 correspond to the JPEG files 202, 203, . . . , and 204, respectively. The RAW files 232 to 234 each are reversibly compressed, and are different in file size depending on the complexity of image data, but the file size is approximately 20 MB per file.

Therefore, the HDD 231 having the capacity of 500 GB is capable of storing approximately 25000 RAW files. This capacity is sufficient, when considering the photographing frequency of a general user.

A program storing section 235 is defined in the HDD 231, and stores programs executed in the PC 150 and an OS. The programs are loaded from the program storing section 235 into a DRAM 236, and are executed by a CPU 243.

In the illustrated example, the OS, denoted by reference numeral 240, a control program 237, and a communication control program 238 are loaded in the DRAM 236 as the programs. Further, a working memory 239, which is a work area for the CPU 243, is defined in the DRAM 236.

The control program 237 is a program for controlling various operations, such as operations for control of the execution sequence of various programs, and a display section 241 is controlled by the control program 237.

The communication control program 238 is a program for controlling a communication section 246. The working memory 239 is a memory area used as a working memory when executing the programs in the DRAM 236.

The display section 241 displays an image and various information, and is e.g. a liquid crystal display. An input section 242 is used when a user inputs various instructions, and includes e.g. a keyboard and a pointing device.

A power switch 244 includes a button operated by a user when starting or shutting down the PC 105. Further, the PC 105 performs communication with other apparatuses using the communication section 246.

The display section 241, the input section 242, the HDD 231, the CPU 243, the DRAM 236, and the communication section 246, mentioned above, are interconnected via an internal bus 245. Further, in the illustrated example in FIG. 2, although other components are omitted, the PC 105 has the components similar to those of a general PC.

The server apparatus 107 appearing in FIG. 2 has a configuration similar to that of the PC 105, and hence description thereof is omitted.

The camera 102 includes e.g. an SD card as a memory card 261, and the memory card 261 can be mounted and removed to and from the camera 102. Further, the memory card 261 records image data (RAW file) obtained through photographing performed by the camera 102.

In the illustrated example, the memory card 261 has recorded RAW files 262, 263, . . . , and 264, which have been photographed by the camera 102 in the "RAW+JPEG photographing mode". These RAW files 262, 263, . . . , and 264 each have a JPEG file and a RAW file, which have been simultaneously stored.

A ROM 265 stores a control program, and the control program is loaded from the ROM 265 into a DRAM 266, and is executed by a CPU 276. Note that a working memory 269, which is a work area for the CPU 276, is defined in the DRAM 266.

A power switch 274 includes a button operated by a user when starting or shutting down the camera 102. An image pickup section 275 includes a photographic lens unit, a diaphragm, a shutter, an image pickup device, such as a MOS or CCD sensor, an A/D converter, and so forth, and photographs an object to thereby obtain an image signal.

An image processing processor 277 performs predetermined image processing (development processing and the like) on an image signal (i.e. RAW data) output from the image pickup section 275 to thereby generate e.g. a JPEG file. A Wi-Fi communication section 273 performs communication with other apparatuses under the control of the CPU 276.

A display section 272 displays an image and various information, and is e.g. a liquid crystal display. An input section 271 is used when a user inputs various instructions, and includes various buttons and keys.

In the illustrated example in FIG. 2, although other components are omitted, the camera 102 has components similar to those of a general camera.

Now, let it be assumed that the mobile terminal 101 displays JPEG images corresponding to the JPEG files 202, 203, . . . , and 204, respectively, on the display section 216. Here, a description will be given of processing in which the mobile terminal 102 displays images, which are obtained by developing the RAW files corresponding to these JPEG images, on the display section 216 in response to a user's operation.

First, an apparatus registration process will be described which is performed for registering the mobile terminal 101, the PC 105, or the camera 102, as a storing apparatus storing RAW files, in the server apparatus 107, by the storing apparatus and the server apparatus 107.

The apparatus registration process may be performed by each of the mobile terminal 101, the PC 105, and the camera 102, and any of the apparatuses may perform a registration process for registering any of the other apparatuses as a storing apparatus. Further, registration of a storing apparatus may be performed by any of the mobile terminal 101, the PC 105, and the camera 102 through acquiring information on the self-apparatus, or may be performed through acquiring information on any of the other apparatuses.

FIG. 3 is a flowchart of the apparatus registration process performed by the mobile terminal 101, the PC 105, or the camera 102, and the server apparatus 107, appearing in FIG. 2. Note that in FIG. 3, an apparatus that requests the apparatus registration process is referred to as the requesting apparatus.

In the requesting apparatus, the CPU creates apparatus information concerning the storing apparatus according to a user's input (step S301). Then, the CPU transmits apparatus registration request information including a code indicating that apparatus registration is requested and the apparatus information to the server apparatus 107 (step S303).

When the server apparatus 107 receives the apparatus registration request information (step S305), the CPU 243 performs a storing apparatus information update process for adding the apparatus information to storing apparatus information to thereby update the storing apparatus information (step S306). Then, the CPU 243 transmits the result of the storing apparatus information update process to the requesting apparatus (step S307). The requesting apparatus receives the result of the storing apparatus information update process (step S308), followed by terminating the apparatus registration process.

Figures 4A, 4B:
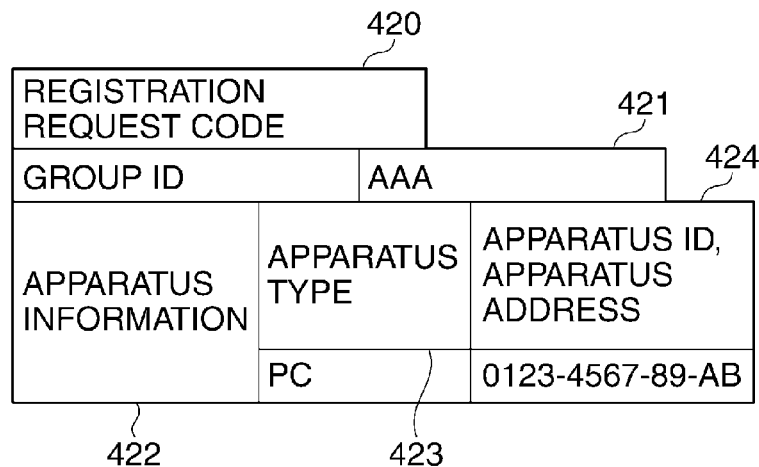
FIG. 4A is a diagram showing apparatus registration request information.
FIG. 4B is a diagram showing apparatus information.

FIGS. 4A and 4B are diagrams useful in explaining the apparatus registration request information and the storing apparatus information, generated in the apparatus registration process in FIG. 3. FIG. 4A shows the apparatus registration request information, and FIG. 4B shows the storing apparatus information.

Referring to FIG. 4A, the apparatus registration request information includes a registration request code 420 indicating that storing apparatus registration is requested, a group ID 421 for identifying a group, and apparatus information 422. The group ID 421 is information indicative of a group of apparatuses, including cameras and tablets.

The group ID 421 may be information indicative of a group which cooperatively operates using the apparatus as a medium, and may be a user ID registered in the server apparatus 107 or an ID for identifying a group formed by a plurality of users.

The apparatus information 422 includes a apparatus type 423, which is information indicative of a type of the apparatus, and an apparatus ID & apparatus address 424, which is information for uniquely identifying the apparatus.

Referring to FIG. 4B, the storing apparatus information includes information on a plurality of storing apparatuses registered by the apparatus registration request process. The apparatus information includes the group ID 421 for identifying a group, the apparatus type 423 indicative of a type of the apparatus, and the apparatus ID & apparatus address 424 formed by the apparatus ID for uniquely identifying the apparatus and the apparatus address used for use in connecting to the apparatus.

Figure 5:
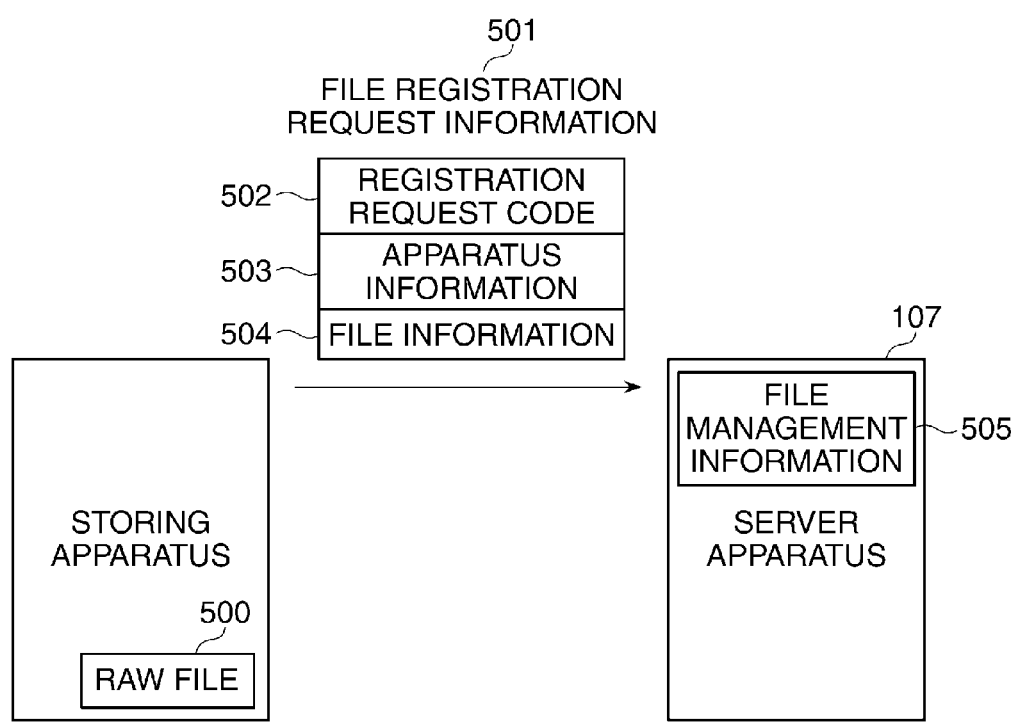
FIG. 5 is a diagram useful in explaining a process for updating file management information, which is performed when a requesting apparatus has transmitted file registration request information to the server apparatus.

FIG. 5 is a diagram useful in explaining a process for updating file management information, which is performed when the requesting apparatus has transmitted the file registration request information to the server apparatus 107.

In a case where the requesting apparatus holds the RAW files, when the requesting apparatus has a RAW file added thereto e.g. by receiving a RAW file or by performing internal processing, the requesting apparatus transmits the file registration request information to the server apparatus 107. When the server apparatus 107 receives the file registration request information, it updates the file management information.

When a RAW file is acquired by performing image pickup processing using the image pickup section of the self-apparatus, or a RAW file 500 is added to the storage section by receiving the same from any of the other apparatuses, the requesting apparatus acquires file information 504 from the RAW file, and acquires apparatus information 503 of the self-apparatus from the storage section. Then, the requesting apparatus adds a registration request code 502 to the acquired information 503 and 504 to thereby create file registration request information 501, and transmits the created file registration request information 501 to the server apparatus 107.

When the server apparatus 107 receives the file registration request information 501, it stores the file management information, denoted by reference numeral 505. More specifically, in the server apparatus 107, when the CPU 243 receives the file registration request information 501, and determines that the received information is a file registration request, the CPU 243 adds the file information 504 included in the file registration request information 501 to the file management information to thereby update the file management information 505.

Figure 6:
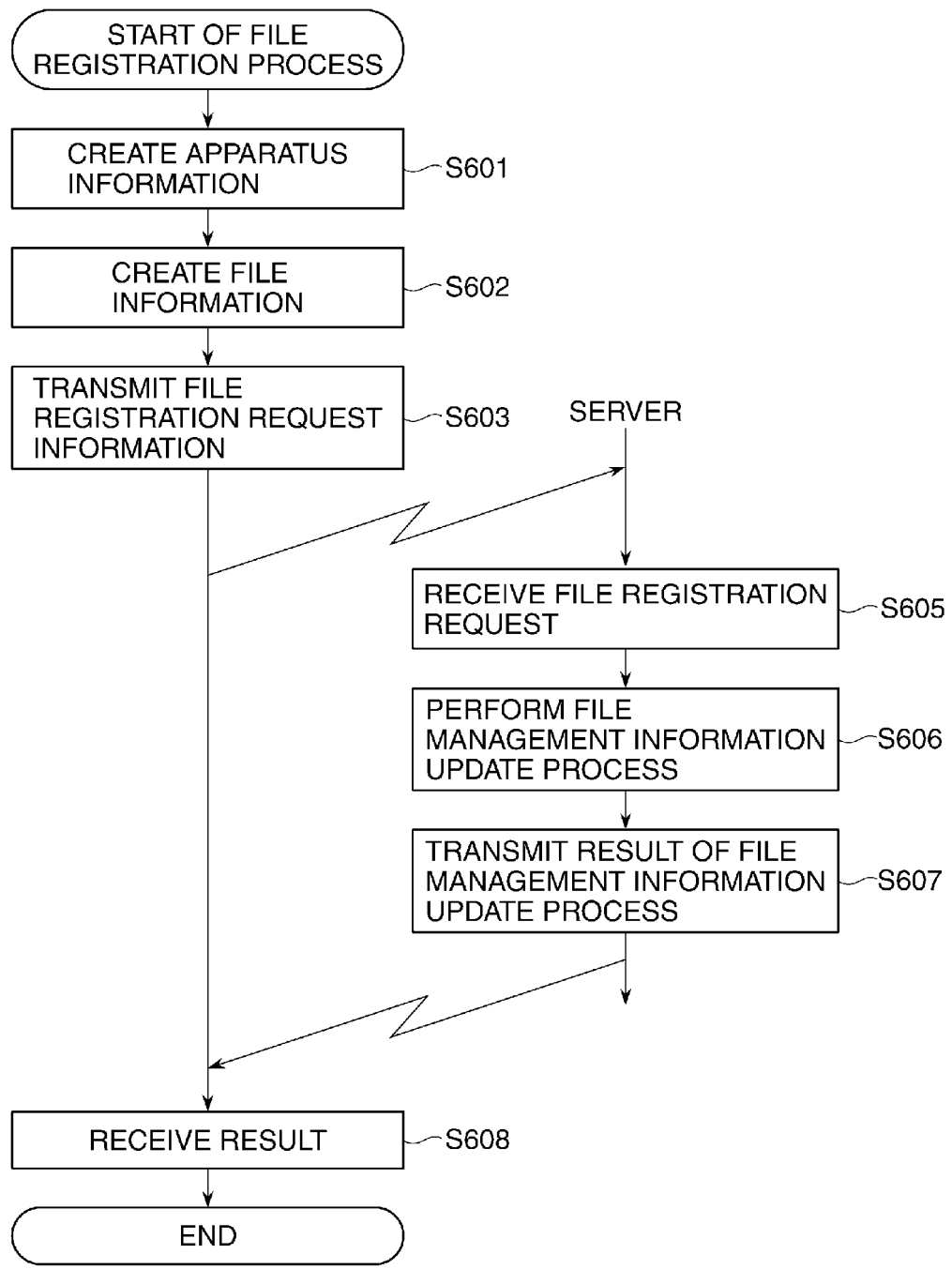
FIG. 6 is a flowchart of a file registration process performed by the requesting apparatus and the server apparatus.

FIG. 6 is a flowchart of a file registration process performed by the requesting apparatus and the server apparatus 107, appearing in FIG. 2.

In the requesting apparatus, upon detection of addition of a RAW file, the CPU creates apparatus information concerning the self-apparatus (step S601). Then, the CPU creates file information concerning the added RAW file (step S602).

Next, in the requesting apparatus, the CPU transmits the file registration request information including a code indicating that file registration request is requested, the apparatus information, and the file information, to the server apparatus 107 (step S603).

In the server apparatus 107, upon receipt of the file registration request information (step S605), the CPU 243 adds the file information included in the received file registration request information to the file management information to thereby update the file management information (step S606). Then, the CPU 243 transmits the result of processing for updating the file management information to the requesting apparatus (step S607).

When the requesting apparatus receives the result of processing for updating the file management information from the server apparatus 107 (step S608), the requesting apparatus terminates the file registration process.

FIGS. 7A and 7B are diagrams useful in explaining the file registration request information 501 and the file management information 505, appearing in FIG. 5. FIG. 7A shows the file registration request information, and FIG. 7B shows the file management information.

Referring to FIG. 7A, as mentioned above, the file registration request information 501 includes the registration request code 502 indicating that file registration is requested, the apparatus information 503 indicative of the self-apparatus, and the file information 504 concerning the RAW file added to the storing apparatus.

The apparatus information 503 includes an apparatus type 722 indicative of the type of the apparatus, and an apparatus ID & apparatus address 723 formed by an apparatus ID for uniquely identifying the apparatus and an apparatus address. The file information 504 has an image ID 726 as an identifier for uniquely identifying association between the JPEG file and the RAW file.

Referring to FIG. 7B, the file management information 505 is information indicating in which storing apparatus the RAW file has been stored by the file registration request process. The file management information 505 includes the apparatus information 503 concerning the storing apparatus and the file information 504 indicative of the RAW file stored in the storing apparatus.

Although in the illustrated example in FIGS. 5 and 6, the storing apparatus having received the RAW file transmits the file registration request information to the server apparatus 107, the apparatus having transmitted the RAW file may transmit the file registration request information to the server apparatus 107. In this case, the server apparatus 107 similarly performs processing for updating the file management information.

Figure 8A:
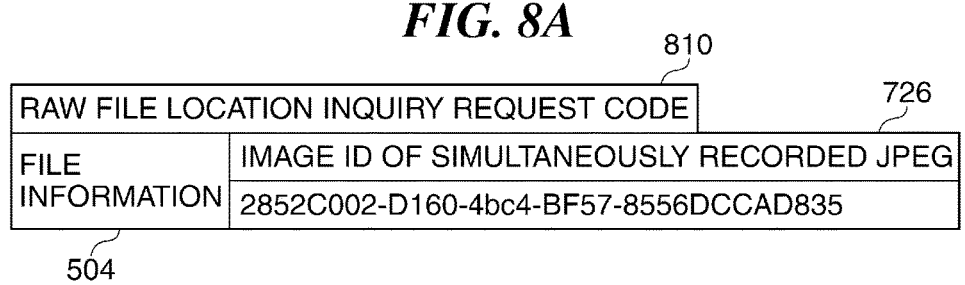
FIG. 8A is a diagram showing RAW file location inquiry request information.
Figure 8B:
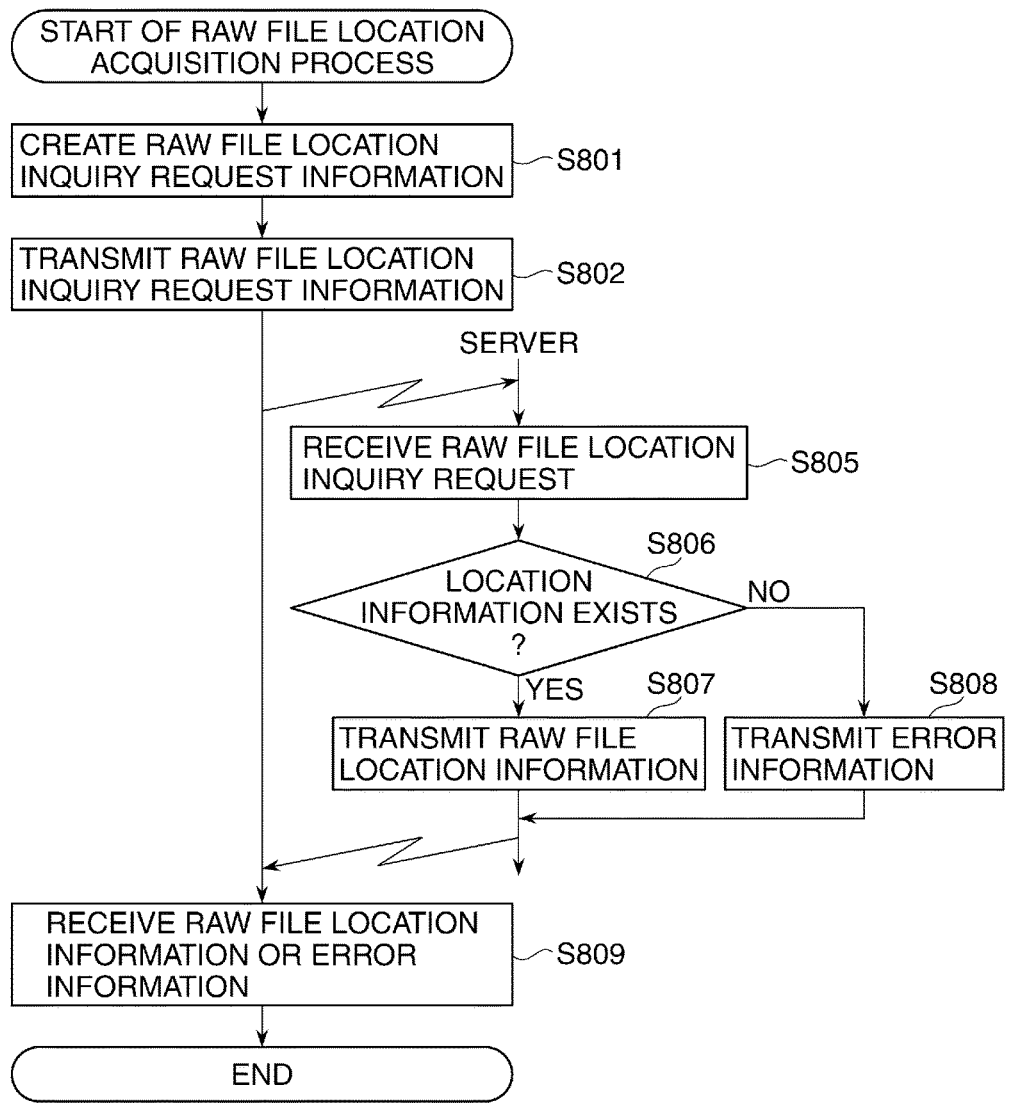
FIG. 8B is a flowchart of a RAW file location acquisition process performed by the mobile terminal and the server apparatus.

FIGS. 8A and 8B are diagrams useful in explaining a process for identifying a storing apparatus storing the RAW file, which is performed by the mobile terminal 101 appearing in FIG. 2. FIG. 8A shows RAW file location inquiry request information, and FIG. 8B is a flowchart of a RAW file location acquisition process performed by the mobile terminal 101 and the server apparatus 107, appearing in FIG. 2.

In this process, the mobile terminal 101 selects a simultaneously recorded JPEG file, and in order to develop and display a simultaneously recorded RAW file corresponding to the JPEG file, the mobile terminal 101 identifies a storing apparatus storing the RAW file.

The RAW file location inquiry request information, shown in FIG. 8A, includes a RAW file location inquiry request code 810 and the file information 504. The RAW file location inquiry request code 810 indicates that the server apparatus 107 is requested to inquire about a storing apparatus storing the RAW file. Further, the file information 504 is information for identifying the RAW file.

Referring to FIG. 8B, in the mobile terminal 101, the CPU 219 creates the RAW file location inquiry request information (step S801). Then, the CPU 219 controls the communication section 218 to transmit the RAW file location inquiry request information to the server apparatus 107 (step S802).

In the server apparatus 107, upon receipt of the RAW file location inquiry request information (step S805), the CPU 243 determines whether or not the image ID 726 included in the RAW file location inquiry request information exists in the file management information (step S806). If location information corresponding to the image ID exists (YES to the step S806), the CPU 243 transmits the apparatus information concerning the storing apparatus storing the RAW file to the mobile terminal 101 (step S807).

On the other hand, if the location information does not exist (NO to the step S806), the CPU 243 transmits error information (step S808). Then, in the mobile terminal 101, upon receipt of the apparatus information or the error information (step S809), the CPU 219 terminates the RAW file location acquisition process.

Figure 9A:
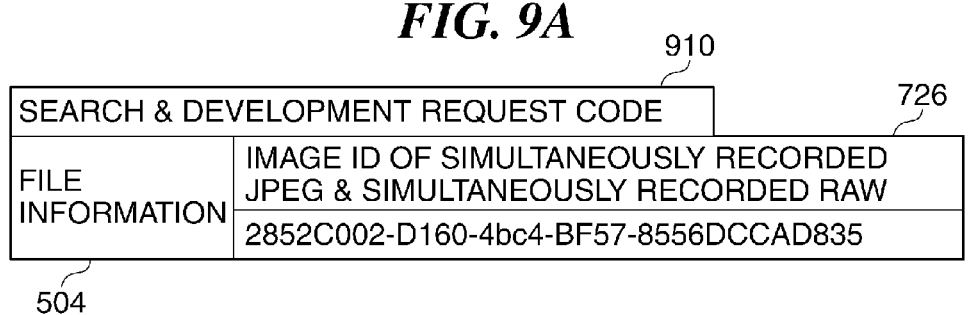
FIG. 9A is a diagram showing RAW file search & development request information.
Figure 9B:
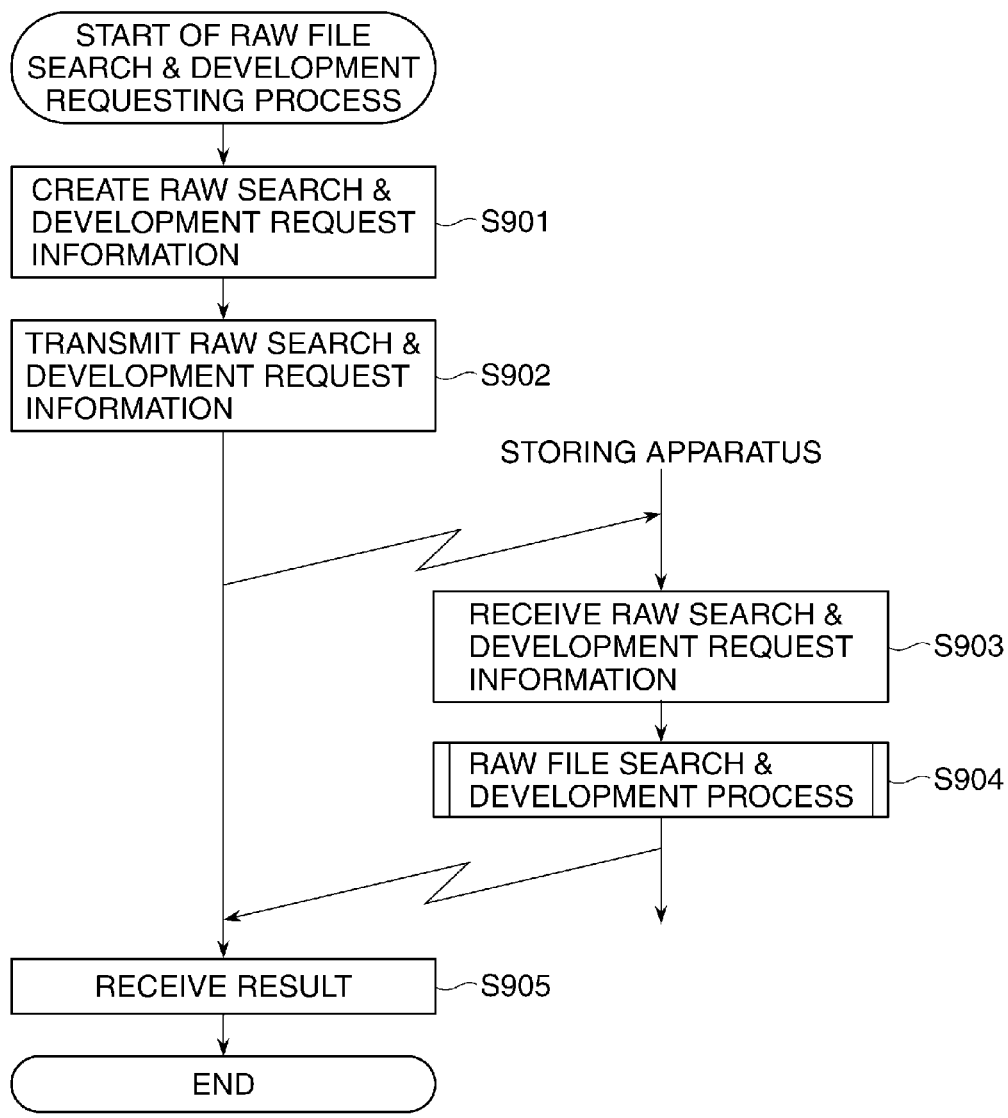
FIG. 9B is a flowchart of a RAW file search & development process performed by the mobile terminal and the storing apparatus.

FIGS. 9A and 9B are diagrams useful in explaining a process for requesting the search and development of a RAW file, which is performed by the mobile terminal 101 appearing in FIG. 2. FIG. 9A shows RAW file search & development request information, and FIG. 9B is a flowchart of a RAW file search & development request process performed by the mobile terminal 101 and the storing apparatus.

In this process, the mobile terminal 101 identifies the storing apparatus storing the RAW file in the above-described manner, and requests the storing apparatus to search for the RAW file and develop the RAW file found by the search. Then, the storing apparatus performs processing for developing the RAW file found by the search.

The RAW file search & development request information shown in FIG. 9A includes a search & development request code 910, destination information indicative of a destination of the mobile terminal 101 which is a requesting source, and the file information 504. The search & development request code 910 indicates that the storing apparatus storing the corresponding RAW file is requested to search for the RAW file and develop the RAW file found by the search. Further, the file information 504 is information for identifying the RAW file.

Referring to FIG. 9B, in the mobile terminal 101, the CPU 219 creates the RAW search & development request information (step S901). Then, the CPU 219 controls the communication section 218 to transmit the RAW search & development request information to the storing apparatus storing the RAW file according to the location information (step S902).

In the storing apparatus, upon receipt of the RAW search & development request information (step S903), the CPU performs a RAW file search & development process, described hereinafter (step S904), and transmits the result of the process to the mobile terminal 101 according to the destination information. Then, in the mobile terminal, upon receipt of the result of the RAW file search & development process (step S905), the CPU 219 terminates the RAW file search & development request process.

Figure 10:
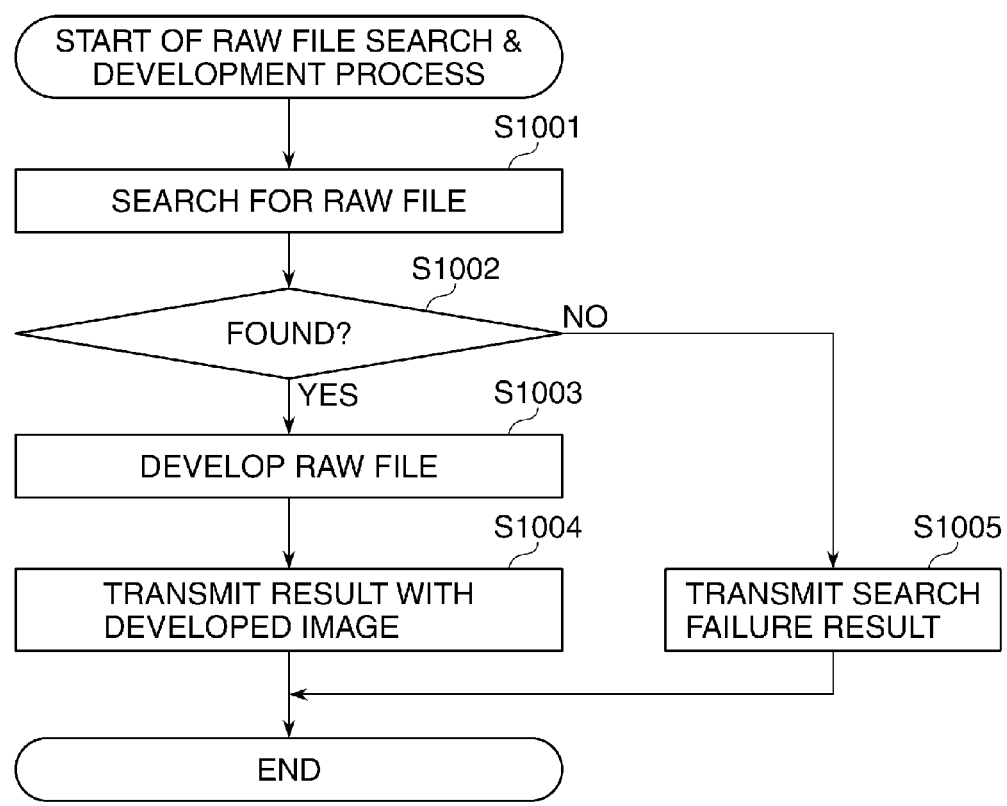
FIG. 10 is a flowchart of the RAW file search & development process performed by the storing apparatus.

FIG. 10 is a flowchart of the RAW file search & development process performed in the process in FIG. 9B.

First, in the storing apparatus, the CPU searches for the RAW file indicated by the image information included in the RAW file search & development request information (step S1001). Then, the CPU determines whether or not the RAW file exists in the self-apparatus (i.e. whether or not the RAW file has been found by the search) (step S1002).

If the RAW file exists in the self-apparatus (YES to the step S1002), the CPU develops the RAW file found by the search (step S1003). Then, the CPU transmits the search result including the image obtained by development processing to the mobile terminal 101 according to the destination information (step S1004), followed by terminating the RAW file search & development process.

On the other hand, if the RAW file does not exist in the self-apparatus (NO to the step S1002), the CPU transmits the failure of the search to the mobile terminal 101 according to the destination information (step S1005). Then, the CPU terminates the RAW file search & development process.

Figure 11A:
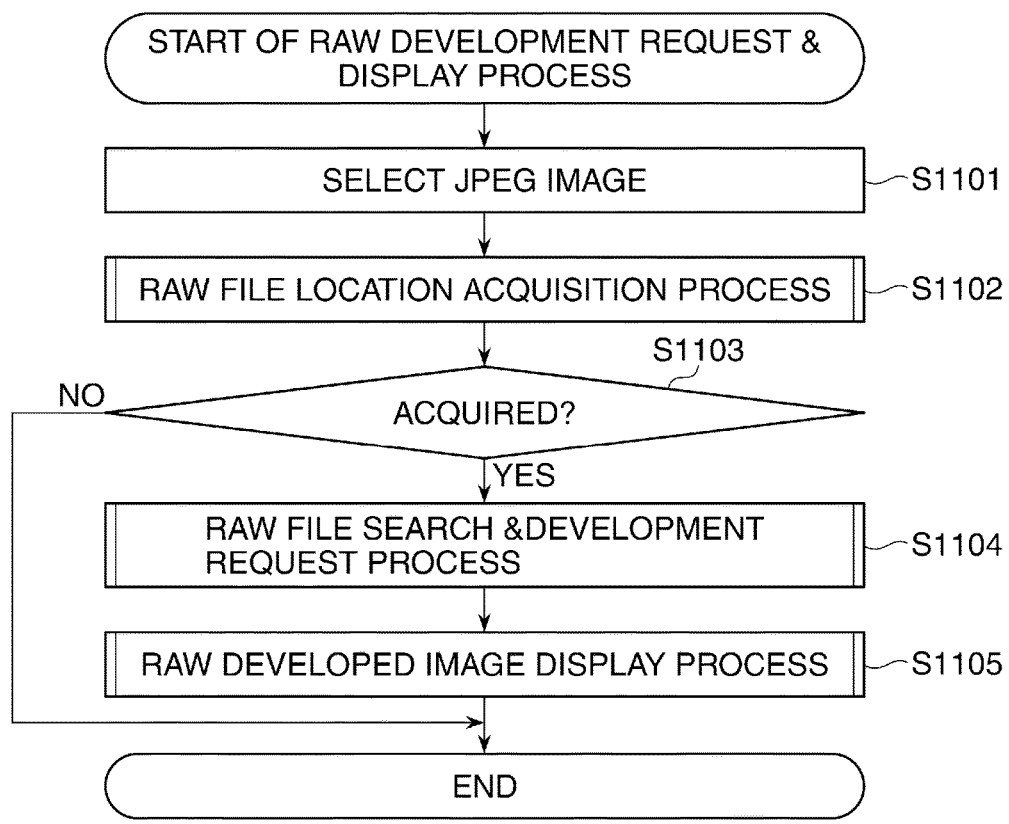
FIG. 11A is a flowchart of a RAW development request & display process performed by the mobile terminal.
Figure 11B:
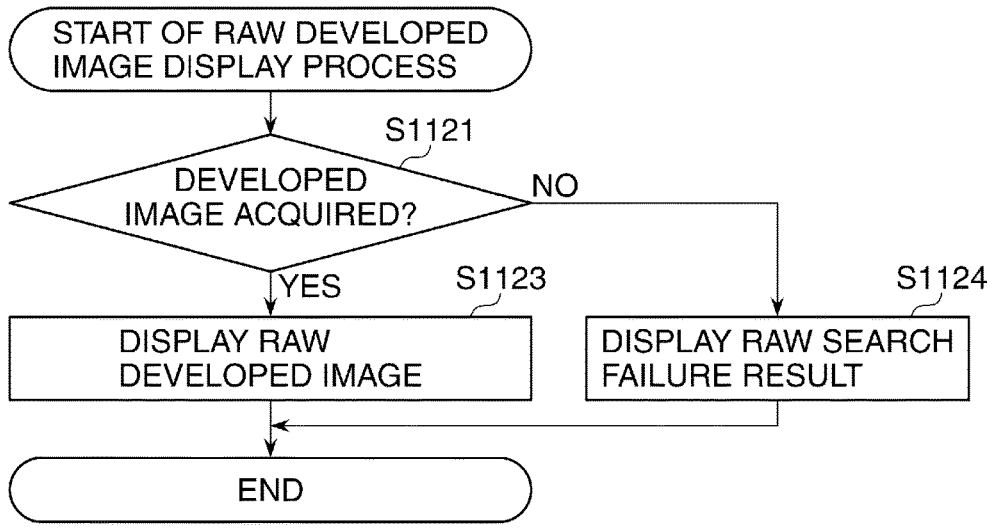
FIG. 11B is a flowchart of a RAW developed image display process performed in a step of the RAW development request & display process in FIG. 11A.

FIG. 11A is a flowchart of a RAW development request & display process performed according to selection of a JPEG file in the mobile terminal 101 appearing in FIG. 2. FIG. 11B is a flowchart of a RAW developed image display process performed in a step of the RAW development request & display process in FIG. 11A.

In these processes, a simultaneously recorded JPEG file is selected in the mobile terminal 101, and the mobile terminal 101 inquires of the server apparatus 107 about the location of the simultaneously recorded RAW file corresponding to the selected JPEG file. Then, the mobile terminal 101 requests the storing apparatus storing the RAW file to search for and develop the RAW file, and displays the image having been subjected to development processing on the screen of the mobile terminal 101.

Referring to FIG. 11A, a user selects one of a plurality of JPEG files in the mobile terminal 101 (step S1101). In this step, the mobile terminal 101 can display the images of the plurality of JPEG files as thumbnail images. Then, when the user selects one of the images displayed as the thumbnail images, a JPEG file corresponding to the selected image is selected, and the image corresponding to the selected JPEG file is displayed on the screen.

Note that the mobile terminal 101 may obtain the names of the JPEG files from the file management information stored in the server apparatus 107 by communication with the server apparatus 107, and display the file names associated with the plurality of JPEG files, and then the user may select one of the plurality of JPEG files based on the file names.

Then, the CPU 219 performs the RAW file location acquisition process described with reference to FIG. 8B (step S1102). Then, the CPU 219 determines whether or not the location information concerning the RAW file has been acquired (step S1103).

If the location information has been acquired (YES to the step S1103), the CPU 219 performs the process for requesting the storing apparatus storing the RAW to perform the RAW file search & development process described with reference to FIG. 9B (step S1104). Here, the description is given of a case where the number of storing apparatuses storing the RAW file is one, for simplicity of the description.

Note that in a case where there are a plurality of information items of storing apparatuses storing the RAW file, the RAW file search & development process is performed in one of the storing apparatuses, which is selected in the mobile terminal 101.

Then, the CPU 219 performs the RAW developed image display process described hereinafter (step S1105). Then, the CPU 219 terminates the RAW development request & display process. On the other hand, if the location information has not been acquired (NO to the step S1103), the CUP 219 immediately terminates the RAW development request & display process.

Referring to FIG. 11B, when the RAW developed image display process is started, the CPU 219 determines whether or not an image subjected to development processing has been acquired from the storing apparatus (step S1121). If the image after being subjected to development processing (RAW developed image) has been acquired (YES to the step S1121), the CPU 219 displays the RAW developed image on the display section 216 (step S1123). Then, the CPU 219 terminates the RAW developed image display process.

On the other hand, if the RAW developed image has not been acquired (NO to the step S1121), the CPU 219 displays information to the effect that the RAW file could not be retrieved on the display section (step S1124). Then, the CPU 219 terminates the RAW developed image display process.

As described above, in the first embodiment of the present invention, when selecting a simultaneously recorded JPEG file and thereby displaying an image obtained by developing a simultaneously recorded RAW file on the mobile terminal 101, the mobile terminal 101 inquires of the server apparatus 107 about a storing apparatus storing the corresponding RAW file. Then, the mobile terminal 101 requests the storing apparatus storing the RAW file to search for and develop the RAW file to thereby acquire the developed image.

As a result, the storing apparatus transmits the image obtained by developing the simultaneously recorded RAW file (e.g. a JPEG image) to the mobile terminal 101. That is, the storing apparatus transmits the developed image which is smaller in volume (size) than the RAW file to the mobile terminal 101. Therefore, the mobile terminal 101 can efficiently display the RAW developed image.

In a case where there are a plurality of storing apparatuses each storing the RAW file, by developing the RAW file using a storing apparatus which is highest in development capability, it is possible to efficiently perform development processing to thereby acquire the RAW developed image. In this case, the storing apparatus information held in the server apparatus 107 further includes development capability information indicative of the development capability of the storing apparatus. Then, the mobile terminal 101 receives the storing apparatus information from the server apparatus 107, and may sequentially perform the RAW file search & development request process, starting with the storing apparatus which is highest in development capability out of the plurality of storing apparatuses each storing the RAW file. The development capability information may be received together with the location information corresponding thereto in the step S809. Alternatively, if the location information of the plurality of storing apparatuses is received in the step S809, the mobile terminal 101 may inquire of the server apparatus 107, and receive the development capability information of the plurality of storing apparatuses.

Figure 12:
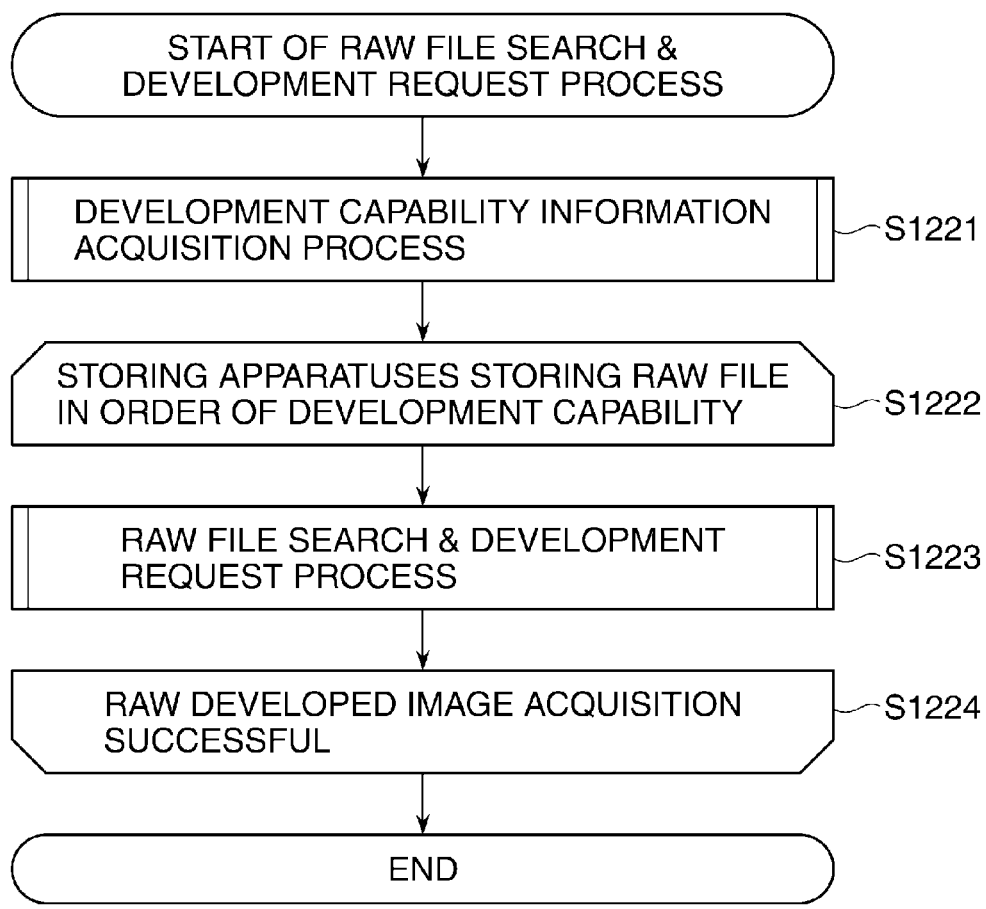
FIG. 12 is a flowchart of a RAW file search & development request process performed by the mobile terminal in a case where the mobile terminal receives storing apparatus information including development capability information.

FIG. 12 is a flowchart of the RAW file search & development request process (corresponding to the step S1104 in FIG. 11A) performed when the mobile terminal 101 receives the storing apparatus information including the development capability information.

First, in the mobile terminal 101, the CPU 219 performs the development capability information acquisition process (step S1221). Then, the CPU 219 determines an order of the plurality of storing apparatuses each storing the RAW file according to a decreasing order of to the respective development capabilities of the storing apparatuses. Then, the CPU 219 sequentially performs the following process on the storing apparatuses starting with one highest in development capability (step S1222).

The CPU 219 performs the process for requesting the storing apparatus storing the RAW file to search for and develop the RAW file (RAW file search & development request process) described with reference to FIG. 9B (step S1223). Then, when the RAW file search & development process is successful in acquiring the RAW developed image (step S1224), the CPU 219 terminates the RAW file search & development request process.

Alternatively, the CPU 219 performs the RAW file search & development request process only for one of the plurality of storing apparatuses each storing the RAW file, which is highest in development capability, based on the development capability information, and if the process is successful, the CPU 219 terminates same. On the other hand, if the process fails, the CPU 219 may perform the same for a remaining one of the storing apparatuses irrespective of the level of the development capability.

As described above, in the case where there are a plurality of storing apparatuses each storing the RAW file, the mobile terminal 101 performs the RAW file search & development request process with preference to a storing apparatus which is higher in development capability. As a consequence, the mobile terminal 101 can efficiently perform development processing, and thereby acquire the RAW developed image.

Further, in a case where a storing apparatus is not connected to the network, if the mobile terminal 101 performs the RAW file search & development request process with respect to the storing apparatus which is not connected to the network, the mobile terminal 101 cannot acquire the RAW developed image due to a communication error.

To cope with this, the mobile terminal 101 may determine whether or not the mobile terminal 101 can communicate with a storing apparatus via a network, and then perform the RAW file search & development request process with respect to the storing apparatus in a communicable state.

Figure 13:
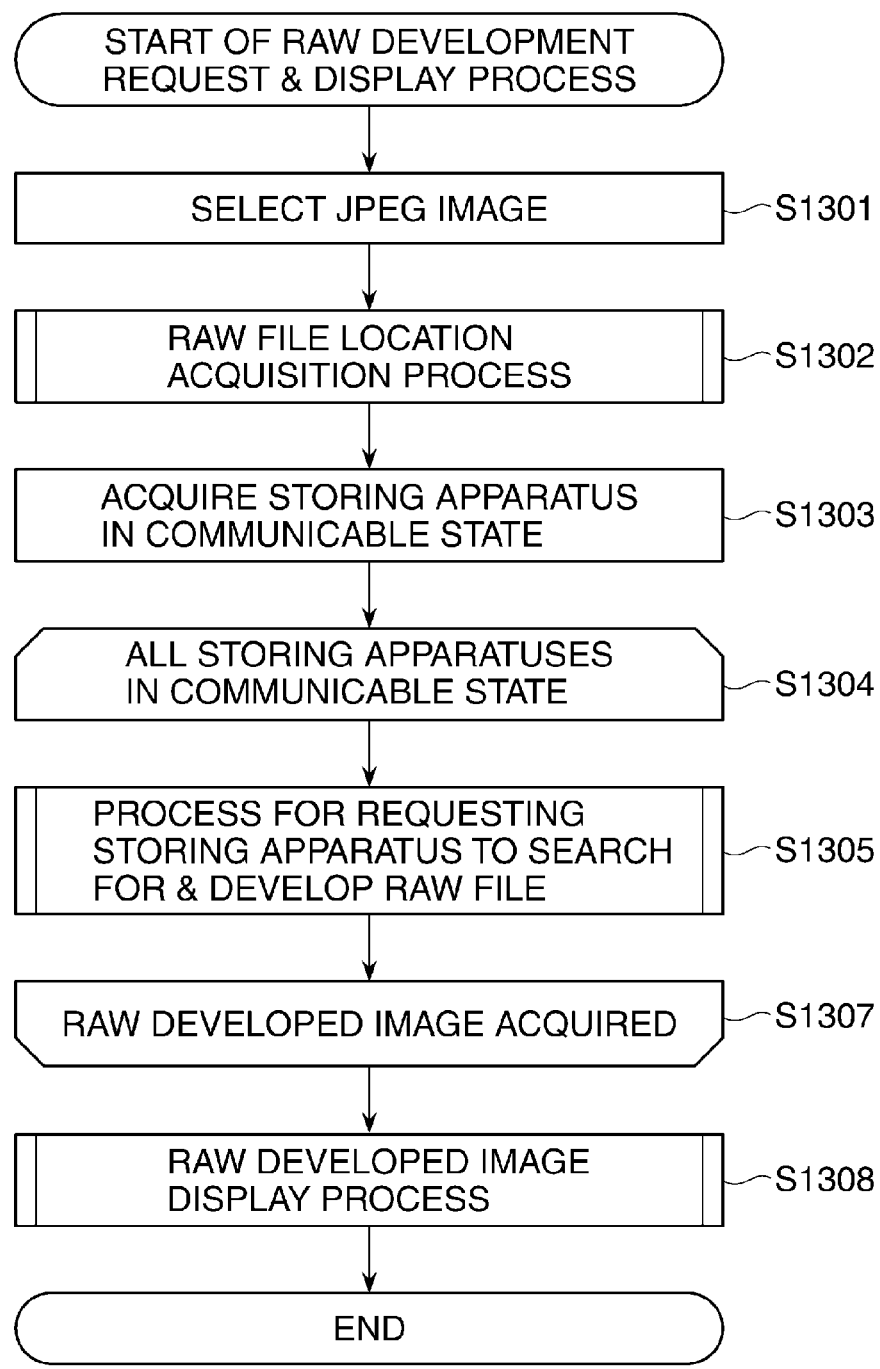
FIG. 13 is a flowchart of a RAW development request & display process performed by the mobile terminal in a case where a state of connection of the storing apparatus to the network is determined.

FIG. 13 is a flowchart of a RAW development request & display process performed by the mobile terminal 101 in a case where a state of connection of the storing apparatus to the network is determined.

In the mobile terminal 101, the CPU 219 performs the JPEG image selection process similarly to the step S1101 in FIG. 11A (step S1301). Then, the CPU 219 performs the RAW file location acquisition process similarly to the step S1102 (step S1302).

Next, the CPU 219 determines a storing apparatus in a communicable state (step S1303). In this step, the CPU 219 determines storing apparatuses in a communicable state, by communicating with each storing apparatus to thereby check the network communication state. Then, the CPU 219 sequentially performs steps S1305 and S1307 with respect to each of the storing apparatuses in the communicable state (step S1304).

In the step S1305, the CPU 219 performs the process for requesting the object storing apparatus to search for and develop the RAW file (RAW file search & development request process), described with reference to FIG. 9B. Then, in the step S1307, the CPU 219 determines based on the result of the RAW file search & development request process whether or not the RAW developed image has been acquired.

If it is determined in the step S1307 that the RAW developed image has not been acquired, the CPU 219 returns to the step S1305, and repeats the process with respect to the next storing apparatus. If it is determined in the step S1307 that the RAW developed image has been acquired, the CPU 219 performs the RAW developed image display process described with reference to FIG. 11B (step S1308), followed by terminating the RAW development request & display process.

The above description has been given of the case where the RAW file search & development request process is sequentially performed for a plurality of storing apparatuses, and when a RAW developed image is received from one of the storing apparatuses, the RAW development request & display process is terminated. However, this is not limitative, but the RAW file search & development request process may be performed for all of the plurality of storing apparatuses which are determined to be in the communicable state.

As described above, the mobile terminal 101 determines a storing apparatus which is connected to the network and is in a communicable state, and performs the RAW file search & development request process for the storing apparatus in the communicable state.

As a consequence, for example, even when the PC 105 on the network is in an off-line state, if the camera 102 can communicate with the mobile terminal 101 via a proximity network, the mobile terminal 101 can perform the RAW file search & development request process with respect to the camera 102 to thereby acquire the RAW developed image.

Further, also when the storing apparatus is in a power-off state, the mobile terminal 101 cannot acquire the RAW developed image even if the mobile terminal 101 performs the RAW file search & development request process with respect to the storing apparatus which is in the power-off state.

The mobile terminal 101 acquires information indicative of whether or not the storing apparatus can be remotely started, and if the storing apparatus which can be remotely started is in the power-off state, the mobile terminal 101 may perform the RAW file search & development request process after remotely starting the storing apparatus. In this case, the storing apparatus information held in the server apparatus 107 further includes remote startability information of a storing apparatus, and the mobile terminal 101 receives the storing apparatus information from the server apparatus 107.

For example, when an apparatus in a shut-down state or sleep state receives a start packet (Magic Packet) from an external apparatus by the WOL (Wake on LAN) function, the apparatus can be started. Therefore, the remote startability information is information indicative of whether or not each storing apparatus is a WOL-compatible apparatus.

The mobile terminal 101 determines whether or not the storing apparatus is in an activated state, and if the storing apparatus is not in an activated state, the mobile terminal 101 refers to the remote startability information.

If it is determined that the storing apparatus can be remotely started, the mobile terminal 101 transmits the start packet to the storing apparatus to thereby start the storing apparatus, and then the CPU 219 of the mobile terminal 101 performs the process for requesting the started storing apparatus to search for and develop the RAW file, described with reference to FIG. 9B.

As described above, when a storing apparatus storing the RAW file is not in the activated state, the mobile terminal 101 remotely starts the storing apparatus, and hence it is possible to perform the RAW file search & development process in the storing apparatus storing the RAW file.

Further, in the above description, the requesting apparatus transmits the file registration request information to the server apparatus 107, and the server apparatus 107 updates the file management information according to the file registration request information.

However, this is not limitative, but the server apparatus 107 may periodically request the storing apparatus to send information concerning the RAW file stored therein, and may update the file management information according to a response from the storing apparatus.

Thus, the server apparatus 107 can always hold the latest file management information recorded therein.

Further, the file management information may further hold file path information in the storing apparatus. The storing apparatus searches the self-apparatus for a RAW file according to the designated file path information, and then if the RAW file is not found at a location indicated by the file path information, the storing apparatus may further search the self-apparatus.

Thus, the storing apparatus checks whether or not the RAW file exists in the designated file path first, and hence it is possible to quickly retrieve the RAW file.

Further, in the above description, the mobile terminal 101 acquires the location information concerning the RAW file from the server apparatus 107, and performs the RAW file search & development request process with respect to the storing apparatus corresponding to the location information. However, this is not limitative, but the file management information may not be stored in the server apparatus 107. The mobile terminal 101 acquires the apparatus information updated by the server apparatus 107 in the step S306 of the process in FIG. 3, and may perform the RAW file search & development request process with respect to the apparatus based on the acquired apparatus information irrespective of whether or not the storing apparatus is the one storing the RAW file to thereby acquire the RAW developed image. Then, the mobile terminal 101 performs the RAW file search & development request process sequentially with respect to the plurality of apparatuses, and when the mobile terminal 101 receives the RAW developed image from any of the apparatuses, the mobile terminal 101 terminates the RAW development request & display process. Alternatively, the mobile terminal 101 may perform the RAW file search & development request process with respect to all of the plurality of apparatuses.

As described above, even if the file management information is not stored in the server apparatus 107, the mobile terminal 101 performs the RAW file search & development request process with respect to the apparatuses indicated by the apparatus information, and can receive the RAW developed image from one of the apparatuses.

Further, in the above description, the storing apparatus searches for the RAW file, develops the RAW file found by the search, and transmits the RAW developed image to the mobile terminal 101. However, this is not limitative, but the storing apparatus may transmit the RAW file obtained by the search to the mobile terminal 101. Then, the mobile terminal 101 may develop the received RAW file, and generate and display the RAW developed image.

Next, a description will be given of an image processing system according to a second embodiment of the present invention. The image processing system according to the second embodiment has the same configuration as that of the image processing system shown in FIGS. 1 and 2.

In the above-described embodiment, the storing apparatus information, the file management information, the development capability information, and the startability information are managed in the server apparatus 107. In the present embodiment, a case will be described where the mobile terminal 101 holds the storing apparatus information, the file management information, the development capability information, and the startability information.

Although in the apparatus registration process shown in FIG. 3, the requesting apparatus transmits the apparatus registration request information to the server apparatus 107 in the step S303, in the present embodiment, the requesting apparatus transmits the apparatus registration request information to the mobile terminal 101.

Further, although in the steps S305 and S306 appearing in FIG. 3, the server apparatus 107 receives the apparatus registration request, and updates the storing apparatus information, in the present embodiment, the mobile terminal 101 executes the steps S305 and S306.

Next, although in the step S603 of the file registration process shown in FIG. 6, the storing apparatus transmits the file registration request information to the server apparatus 107, in the present embodiment, the storing apparatus transmits the file registration request information to the mobile terminal 101.

Further, although in the steps S605 and S606 appearing in FIG. 6, the server apparatus 107 receives the file registration request and updates the file management information, in the present embodiment, the mobile terminal 101 executes the steps S605 and S606.

Further, although in the above-described embodiment, the server apparatus 107 periodically performs the file information update process, in the present embodiment, the mobile terminal 101 periodically performs the file information update process.

Figure 14:
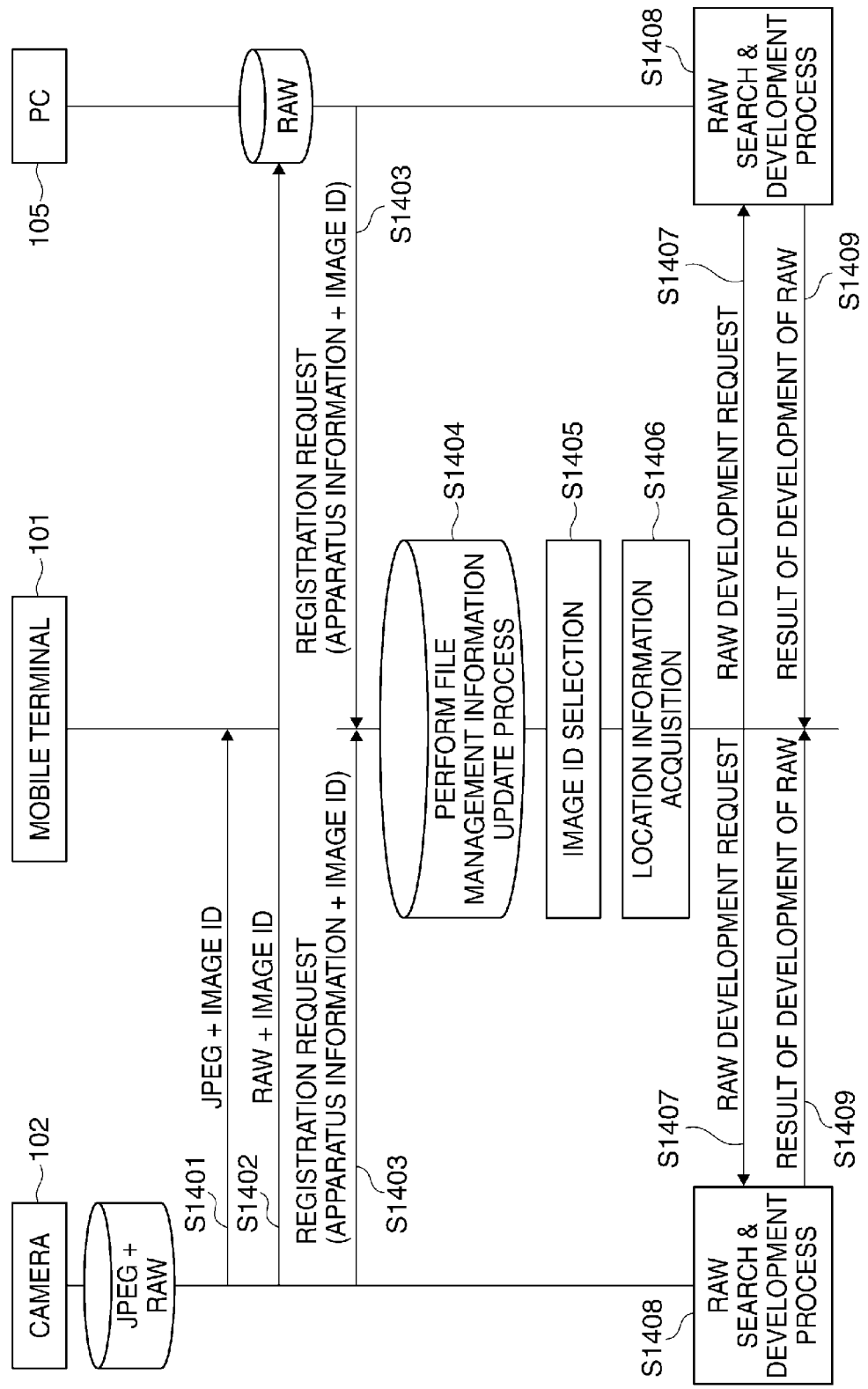
FIG. 14 is a sequence diagram of a RAW developed image acquisition process performed in the image processing system.

FIG. 14 is a sequence diagram showing the operations of the mobile terminal 101, the camera 102, and the PC 105 in the image processing system according to the present embodiment.

The camera 102 generates RAW files and JPEG files by image pickup processing, and records the generated RAW files and JPEG files in a recording medium, such as a memory card. Then, the camera 102 transmits the JPEG files and the image IDs to the mobile terminal 101 (step S1401). The camera 102 transmits the RAW files and the image IDs to an external apparatus, such as the PC 105 (step S1402). The camera 102 or the external apparatus, such as the PC 105, holding the RAW files, transmits the file registration request information to the mobile terminal 101 (step S1403), and the mobile terminal 101 performs the file management information update process based on the received file registration request information (step S1404). The mobile terminal 101 displays thumbnail images corresponding to the plurality of JPEG files, respectively, as a list on the display section, selects a thumbnail image in response to a user's operation, and selects the image ID of the JPEG file corresponding to the selected thumbnail image (step S1405). The mobile terminal 101 refers to the file management information based on the image ID, and acquires information concerning an apparatus holding the RAW file corresponding to the image ID (location information) (step S1406). The mobile terminal 101 connects to and communicates with the apparatus holding the RAW file (the camera 102 or the PC 105) based on the location information, and performs the RAW file search & development request process using the image ID (step S1407). The apparatus holding the RAW file searches for the RAW file corresponding to the image ID and performs development processing on the RAW file found by the search to thereby generate a RAW developed image (Step S1408). The apparatus holding the RAW file transmits the RAW developed image to the mobile terminal 101 (step S1409). Note that the RAW developed image may be uploaded to a WEB server apparatus instead of being transmitted to the mobile terminal 101, and a URL of the RAW developed image may be transmitted to the mobile terminal 101. This enables the mobile terminal 101 to download the RAW developed image based on the URL.

As described above, in the present embodiment, the mobile terminal 101 holds the storing apparatus information, the file management information, the development capability information, and the startability information, and hence the mobile terminal 101 can immediately obtain the result of development processing without inquiring the other apparatus.

Further, the development capability information and the startability information are stored in the mobile terminal 101, and hence the mobile terminal 101 can perform processing with preference to one of the plurality of storing apparatuses, from which the development processing result can be obtained with a high possibility, using the development capability information or the startability information.

Note that in the step S1404, the mobile terminal 101 may receive the apparatus registration request information in place of the file management information, and perform the apparatus information update process. Then, the mobile terminal 101 may perform the RAW file search & development request process with respect to the apparatus based on the updated apparatus information irrespective of whether or not the apparatus holds the RAW file corresponding to the selected image ID.

As is clear from the above description, in the illustrated example in FIG. 2, the SSD 201 function as a storage unit, and the communication section 218 and the CPU 219 function as an acquisition unit and a requesting unit.

Further, the communication section 218 and the CPU 219 function as a first acquisition unit and a second acquisition unit, and the communication section 218 functions as a reception unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2014-170565 filed Aug. 25, 2014, and Japanese Patent Application No. 2015-149583, filed Jul. 29, 2015, which are hereby incorporated by reference wherein in their entirety.

What is claimed is:

1. An information processing apparatus comprising:
a storage unit configured to store a plurality of processed data items; and
at least one processor connected to a memory, the at least one processor being configured to:
acquire apparatus information concerning an external apparatus holding unprocessed data corresponding to processed data;
communicate with the external apparatus using the apparatus information, and request the unprocessed data; and
receive a result of processing performed on the requested unprocessed data from the external apparatus,
wherein the apparatus information includes at least one of development capability of the external apparatus and remote startability of the external apparatus, and
wherein the at least one processor is configured to request the unprocessed data sequentially from a plurality of external apparatuses according to the apparatus information.

2. The information processing apparatus according to claim 1, wherein the at least one processor configured to acquire the apparatus information from an information management apparatus that manages the apparatus information, via a network.

3. The information processing apparatus according to claim 1, wherein the at least one processor configured to receive, from the external apparatus to which the unprocessed data has been requested, a developed image which is generated through development processing performed by the external apparatus.

4. An information processing apparatus comprising:
a storage unit;
at least one processor connected to a memory, the at least one processor being configured to:
acquire, out of unprocessed data, which is data obtained by an image pickup device and on which predetermined processing has not been performed, and processed data, which is data obtained by the image pickup device and on which the predetermined processing has been performed, the processed data;
store, in the storage unit, the processed data in a manner associated with an identifier for uniquely identifying the unprocessed data and the processed data;
acquire apparatus information concerning a storing apparatus holding unprocessed data associated with the identifier;
request the storing apparatus to perform processing for developing the unprocessed data, according to the apparatus information; and
receive a result of the processing for developing the unprocessed data.

5. The information processing apparatus according to claim 4, wherein the apparatus information is managed by an information management apparatus on a network, and the apparatus information is acquired from the information management apparatus via the network.

6. A method of controlling an information processing apparatus, comprising:
storing a plurality of processed data items;
acquiring apparatus information concerning an external apparatus holding unprocessed data corresponding to processed data;
communicating with the external apparatus using the apparatus information, and requesting the unprocessed data; and
receiving a result of processing performed on the requested unprocessed data from the external apparatus,
wherein the apparatus information includes at least one of development capability of the external apparatus and remote startability of the external apparatus, and
wherein the unprocessed data is requested sequentially from a plurality of external apparatuses according to the apparatus information.

7. A method of controlling an information processing apparatus, comprising:
acquiring processed data out of a combination of unprocessed data and the processed data, wherein the unprocessed data is data obtained by an image pickup device and on which predetermined processing has not been performed, and wherein the processed data is data obtained by the image pickup device and on which the predetermined processing has been performed;
storing the processed data in a manner associated with an identifier for uniquely identifying the unprocessed data and the processed data;
acquiring apparatus information concerning a storing apparatus holding unprocessed data associated with the identifier;
requesting the storing apparatus to perform processing for developing the unprocessed data, according to the apparatus information; and
receiving a result of the processing for developing the unprocessed data.

8. A non-transitory computer-readable storage medium storing a computer-executable program for executing a method of controlling an information processing apparatus, wherein the method comprises:
storing a plurality of processed data items;
acquiring apparatus information concerning an external apparatus holding unprocessed data corresponding to processed data;
communicating with the external apparatus using the apparatus information, and requesting the unprocessed data; and
receiving a result of processing performed on the requested unprocessed data from the external apparatus,
wherein the apparatus information includes at least one of development capability of the external apparatus and remote startability of the external apparatus, and wherein the unprocessed data is requested sequentially from a plurality of external apparatuses according to the apparatus information.

9. A non-transitory computer-readable storage medium storing a computer-executable program for executing a method of controlling an information processing apparatus, wherein the method comprises:

acquiring processed data out of a combination of unprocessed data and the processed data, wherein the unprocessed data is data obtained by an image pickup device and on which predetermined processing has not been performed, and wherein the processed data is data obtained by the image pickup device and on which the predetermined processing has been performed;

storing the processed data in a manner associated with an identifier for uniquely identifying the unprocessed data and the processed data;

acquiring apparatus information concerning a storing apparatus holding unprocessed data associated with the identifier;

requesting the storing apparatus to perform processing for developing the unprocessed data, according to the apparatus information; and receiving a result of the processing for developing the unprocessed data.

* * * * *